(12) United States Patent
Higgins

(10) Patent No.: US 8,036,969 B2
(45) Date of Patent: Oct. 11, 2011

(54) BASKET OPTION HEDGING METHOD

(75) Inventor: Mark Higgins, New York City, NY (US)

(73) Assignee: Goldman Sachs & Co., New York, NY (US)

( * ) Notice: Subject to any disclaimer, the term of this patent is extended or adjusted under 35 U.S.C. 154(b) by 760 days.

(21) Appl. No.: 09/795,428

(22) Filed: Feb. 28, 2001

(65) Prior Publication Data
US 2002/0120542 A1 Aug. 29, 2002

(51) Int. Cl.
*G06Q 40/00* (2006.01)
(52) U.S. Cl. .......................... 705/36 R; 37/38
(58) Field of Classification Search .................... 705/36, 705/37, 38
See application file for complete search history.

(56) References Cited

U.S. PATENT DOCUMENTS

| | | | |
|---|---|---|---|
| 5,784,696 A | 7/1998 | Melnikoff | 705/36 |
| 5,819,238 A * | 10/1998 | Fernholz | 705/36 |
| 5,884,287 A | 3/1999 | Edesess | 705/36 |
| 5,946,667 A * | 8/1999 | Tull et al. | 705/36 |
| 5,978,778 A * | 11/1999 | O'Shaughnessy | 705/36 |
| 6,012,044 A * | 1/2000 | Maggioncalda et al. | 705/36 |
| 6,064,985 A * | 5/2000 | Anderson | 705/36 |
| 6,275,814 B1 * | 8/2001 | Giansante et al. | 705/36 |
| 6,321,212 B1 * | 11/2001 | Lange | 705/37 |
| 6,360,210 B1 | 3/2002 | Wallman | 705/36 |
| 6,601,044 B1 * | 7/2003 | Wallman | 705/36 |
| 2002/0002520 A1 | 1/2002 | Gatto | 705/36 |
| 2002/0007331 A1 | 1/2002 | Lo et al. | 705/36 |

FOREIGN PATENT DOCUMENTS

| JP | 2001155060 A * | 6/2001 |
|---|---|---|
| JP | 2001-312593 | 11/2001 |

OTHER PUBLICATIONS

Chen, S. and Brown, S., "Estimation and Simple Rules for Optimal Portfolio Selection", The Journal of Finance, vol. 38, No. 4 (Sep. 1983), 1087-1093.*
Markowitz, H., The Journal of Finance, vol. 7, No. 1 (Mar. 1952), 77-91.*
Options, Futures & Other Derivatives, Hull, John C., Prentice Hall, 4th Ed., 2000, p. 471.
Derivatives, Wilmott, Paul, John Wiley & Sons, 1998, pp. 153-154, 159-161.
International Search Report dated Sep. 24, 2002 for PCT/US02/05994.
International Preliminary Examination Report dated Jun. 24, 2003 for PCT/US02/05994.
European Search Report dated Apr. 21, 2008 for EP02723259.

* cited by examiner

*Primary Examiner* — Daniel S Felten
(74) *Attorney, Agent, or Firm* — Chadbourne & Parke LLP; John A. Squires

(57) ABSTRACT

A method and system for hedging a correlation risk associated with a basket option that includes a plurality of securities that includes the step of selecting at least two of the plurality of securities and, in the next step, forming a best-of option for the at least two of the plurality of securities. Finally, the best-of option is combined with the basket option to hedge the correlation risk associated with the basket option.

21 Claims, 8 Drawing Sheets

ATMF Basket Price vs Correlation

ATMF Best-Of Price vs Correlation

Prices of Basket + 1.4 * ATMF Best-Of vs Correlation

Prices of Basket + 3 * ATMF Best-Of vs Correlation

BASKET OPTION HEDGING METHOD

BACKGROUND

The following invention relates to basket options and, in particular, to a method for hedging risks associated with basket options.

Basket options are options whose return is based upon the average performance of a pre-set basket of underlying assets. The underlying assets contained in the basket may be of any security type including currencies, equities or commodities. Basket options are typically used to manage the risk associated with a number of securities with a single transaction.

For example, a call option on a basket of currencies gives a buyer of the option the right to receive the currencies designated in the basket in exchange for a base currency either at a prevailing Foreign Exchange (FX) rate or another prearranged rate of exchange. The strike price of the option is based on the weighted value of the component currencies, calculated in the buyer's base currency. In forming the basket option, the buyer may stipulate the maturity of the option, the foreign currency amounts which make up the basket, and the strike price which is expressed in units of the base currency. At option expiration, if the total value of the component currencies in the spot market is less than the strike price of the basket option, then the option expires worthless for calls. If, however, the total value of the component currencies is more than the strike price, the buyer would exercise the option and exchange all of the component currencies for the pre-specified amount of base currency (i.e. the strike price of the option).

While the pricing of an option on an individual security is typically determined using an options pricing model, such as the Black-Scholes model, the price of a basket option also depends on the correlation between the components in the basket. In particular, as the correlation between the basket components increases, the price of the basket option increases, while if the correlation between the basket components decreases, the price of the basket option decreases. The pricing of a basket option therefore includes a risk factor associated with the correlation between the components in the basket.

Institutions that trade basket options look to minimize the correlation risk associated with the basket options. One way to hedge the correlation risk is to enter into another transaction that depends on the same correlation factors included in the basket option. For example, if an institution buys a basket option on the stocks that are included in the S&P 500 then trading options on the Standard and Poor's Index would hedge the correlation risk associated with the basket option.

In many instances, however, a transaction for hedging the correlation risk associated with a particular basket option is unavailable. This is especially the case for basket options including foreign exchanges instruments because there are typically few, if any, FX baskets traded that can be used for hedging purposes. Without a hedging transaction to protect against the correlation risk associated with basket options, institutions either increase the premium for which they are willing to trade such basket options to cover the correlation risk or are deterred from trading basket options altogether.

Accordingly, it is desirable to provide a method for hedging the correlation risk associated with basket options.

SUMMARY OF THE INVENTION

The present invention is directed to overcoming the drawbacks of the prior art. Under the present invention a method for hedging a correlation risk associated with a basket option that includes a plurality of securities. The method includes the step of initially selecting at least two of the plurality of securities and, in the next step, forming a "best-of" option for the at least two of the plurality of securities. The best-of option is combined with the basket option to hedge the correlation risk associated with the basket option. In an exemplary embodiment, all of the plurality of securities are selected and the best-of option is formed for all of the plurality of securities.

Many different best-of options can be utilized to hedge a correlation risk of a given basket. However, in general, an effective hedge can be accomplished by calculating an expected value of a basket on expiration, calculating the effective basket volatility, calculating the effective Delta of the basket option, and calculating strikes for each individual option underlying the best-of option.

Under the method of the present invention, when the correlation risk results from purchasing the basket option, the step of combining the best-of option with the basket option to hedge the correlation risk associated with the basket option includes the step of purchasing the best-of option. When, however, the correlation risk results from selling the basket option, the step of combining the best-of option with the basket option to hedge the correlation risk associated with the basket option includes the step of selling the best-of option.

In an exemplary embodiment, the basket option may include any type of securities including, by way of non-limiting example, FX securities, equities, commodities and debt instruments.

The present invention also provides a method for managing risk associated with a portfolio of securities and includes the steps of forming a basket option for the portfolio of securities and hedging the portfolio of securities with the basket option. Next, a best-of option for the plurality of securities is formed. Finally, the basket option is hedged with the best-of option.

In an exemplary embodiment the basket option is a basket put option and step of hedging the portfolio of securities with the basket option includes the step of purchasing the basket put option. In another exemplary embodiment, the basket option is a basket call option and step of hedging the portfolio of securities with the basket option includes the step of purchasing the basket call option.

In yet another exemplary embodiment, the step of hedging the basket option with the best-of option includes the step of purchasing the best-of option and/or the step of selling the best-of option.

Finally, in the portfolio of securities may include any type of securities including, by way of non-limiting example, FX securities, equities, commodities and debt instruments.

Accordingly, a method is provided for hedging the correlation risk associated with basket options. The invention accordingly comprises the features of construction, combination of elements and arrangement of parts that will be exemplified in the following detailed disclosure, and the scope of the invention will be indicated in the claims. Other features and advantages of the invention will be apparent from the description, the drawings and the claims.

DESCRIPTION OF THE DRAWINGS

For a fuller understanding of the invention, reference is made to the following description taken in conjunction with the accompanying drawings.

DETAILED DESCRIPTION

Figure 1:
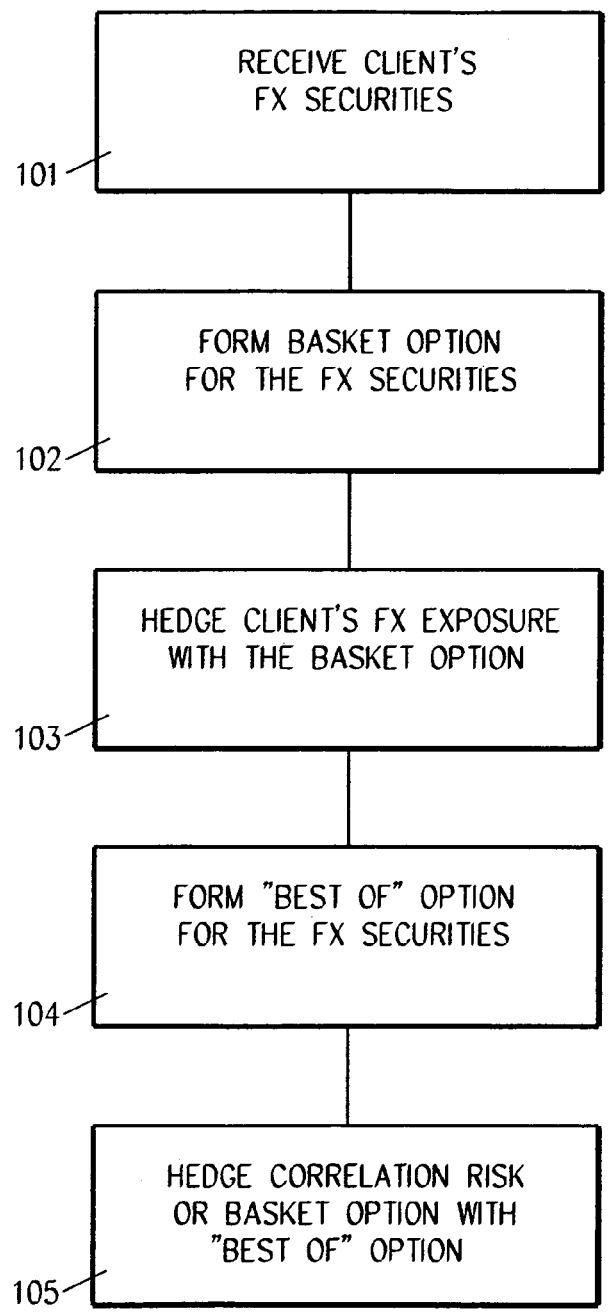
FIG. 1 is a flowchart of the hedging method of the present invention.

Referring now to FIG. 1, a flowchart illustrates steps that can be followed to practice the hedging method of the present invention. As described above, basket options are typically used to hedge a risk associated with a particular position in market. For example, if an investor has a position that includes FX securities, then the investor can instruct a financial institution to enter the investor into a complementary transaction to hedge the investor's FX position. The financial institution receives a description of the specific exposures contained in the investor's FX position 101. For example, an FX position may include an income stream in British pounds, Japanese yen and Mexican pesos.

To hedge the risk associated with the fluctuation of currencies included in a position, with respect to a base currency, e.g., US dollars, a basket option that consists of the FX securities that are included in client's position 102 is formed according to well-known techniques. For example, to hedge the client's position in British pounds, Japanese yen and Mexican pesos, a basket option will include options with respect to those currencies having a strike price and expiration date selected using known hedging techniques, and based upon the client's risk preferences.

The basket option is used to hedge the risk contained in client's portfolio 103. For example, if the client is long British pounds, Japanese yen and Mexican pesos, then the financial institution sells a basket put option containing these currencies that will hedge the client's position if the value of these currencies drop. Similarly, if the client was short these currencies, then the financial institution sells to the client a basket call option to hedge the client's risk if the value of these currencies rise. In addition, the basket option hedge may be applied in cases where the client's portfolio includes both long and short positions, as is well-known in the art.

To hedge the correlation risk associated with the basket option, a best-of option is formed that includes the components included in the basket option 104. For example, if the components in the basket option are British pounds, Japanese yen and Mexican pesos, then a best-of (call) option provides the holder of the option the right to purchase any of the currencies that has increased the most as of the expiration date of the option.

Once the best-of option is formed, the correlation risk associated with the basket option is hedged by "combining" the best-of option to the basket option 105. For example, if the client has purchased from the financial institution a basket option to hedge a particular portfolio, the financial institution then sells the client the matching best-of option as a hedge against the correlation risk included in the basket option.

Figure 2:
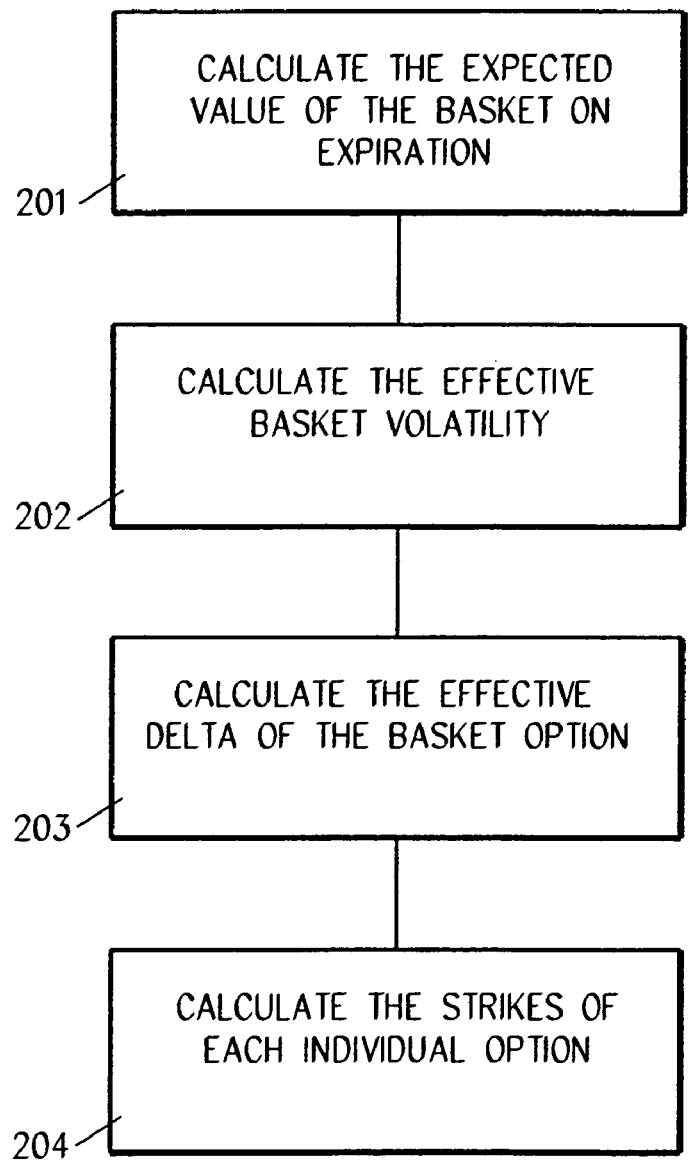
FIG. 2 is a flowchart of steps that can be taken to form a best-of option.

Referring now to FIG. 2, a flowchart of steps for forming a best-of option including a strike price and expiration is illustrated. Many different best-of options can be used to hedge the correlation risks of a given basket. A preferred method for creating an effective hedge includes calculating an expected value of the basket on expiration 201, which can be the weighted sum of the market-traded forwards to the basket expiration.

In addition, the effective basket volatility is calculated 202. One method of calculating the effective basket volatility includes calculating first and second moments of the probability distribution of the basket value on the option expiration and fitting a lognormal distribution to these two moments. The variance of this lognormal distribution is divided by the time to expiration, such that the square root of this value is the effective basket volatility.

Using standard Black-Scholes option pricing formulae, with the forward price set to the expected value of the basket and the volatility set to the effective basket volatility, the effective Delta of the basket option can then be calculated 203.

The strikes of each individual option underlying the best-of option can be calculated 204 by making each individual option's Delta match the effective Delta calculated for the basket option. The quantities of the individual options should be set to match the quantities of the underlying assets in the basket option.

Figure 3A:
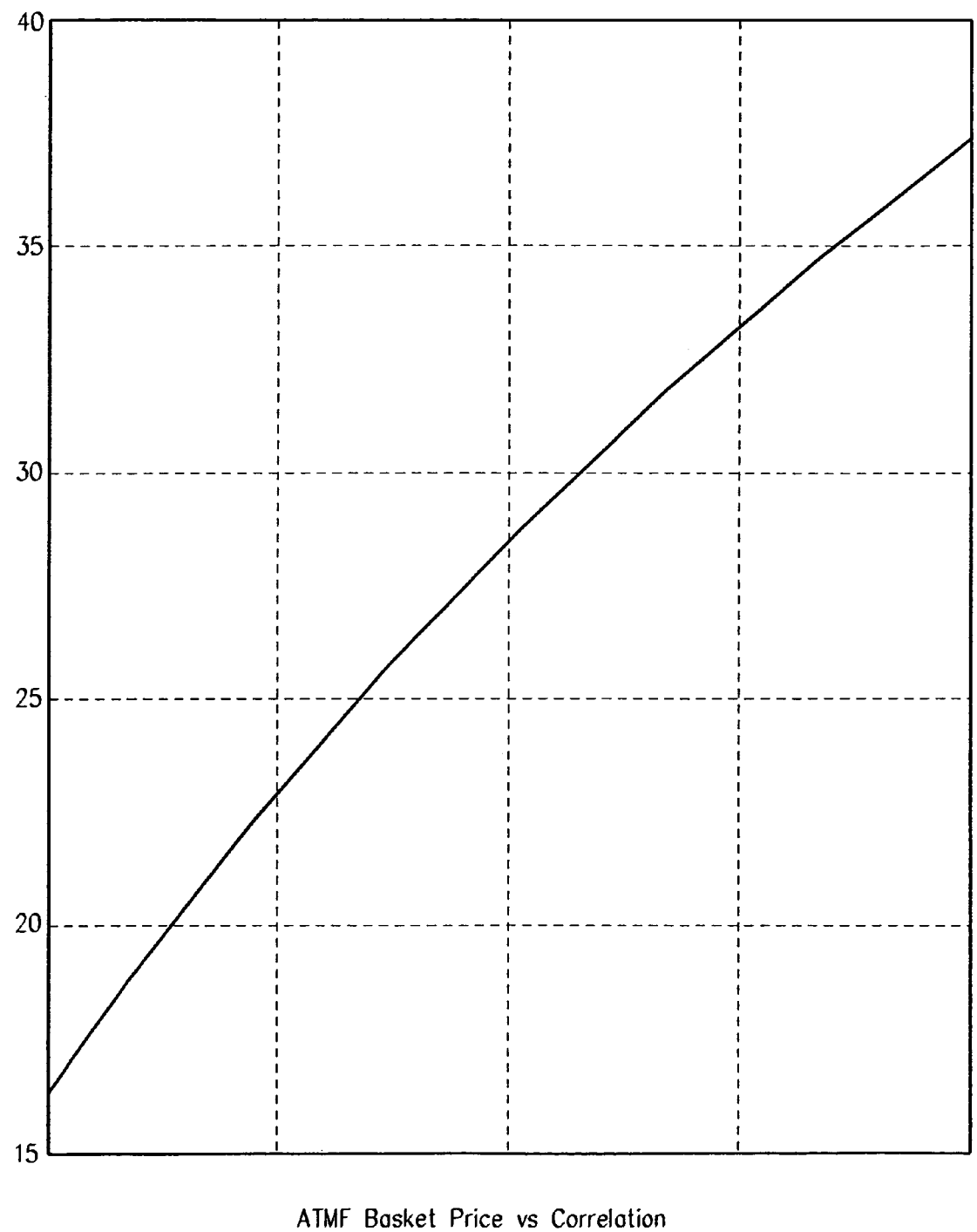
FIG. 3a is a plot of the value of a basket option as a function of the correlation between the basket option components.

Referring now to FIG. 3a, a plot of the value of a basket option is shown. The value of a basket option is a function of the correlation between the components of the option as a function of the correlation between the basket option components. As illustrated in FIG. 3a, the value of the basket option is minimal if the components in the basket are 100% anti-correlated and the value of the basket option reaches a maximum value if the basket components are 100% correlated. Thus, because the value of the basket option depends on the correlation between the basket components, a basket option presents a correlation risk.

In the example of FIG. 3a, the price of an at-the-money-forward (ATMF) basket option (i.e., the strike of the basket option equals the expected value of the basket on its expiration) is illustrated as a function of the correlation between the two assets in the basket. In this example, the first asset has a forward price to the basket option expiration of $100 and a volatility of 40%. The second asset has a forward price of $50 and a volatility of 60%.

The correlation in the plot corresponds to the correlation between day-to-day returns in the two prices. The basket contains one unit of the first asset and two units of the second asset. Its strike equals $200, which is the expected value of the basket (1 * the forward of asset one+2 * the forward of asset two).

Figure 3B:
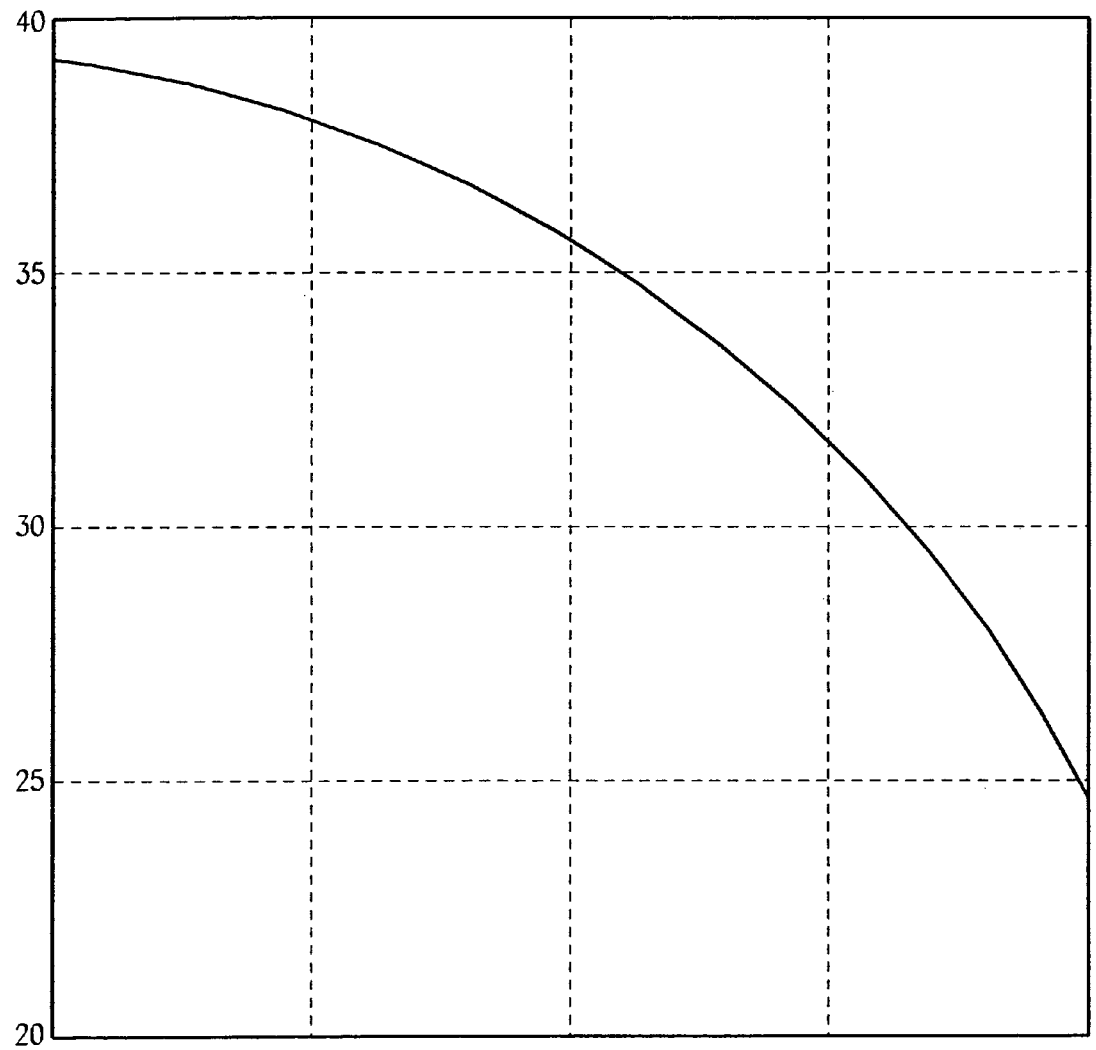
FIG. 3b is a plot of the value of a best-of option as a function of the correlation between the best-of option components.

Referring now to FIG. 3b, a plot of the value of a best-of option as a function of the correlation between the best-of option components is shown. As illustrated, if the best-of component currencies are 100% anti-correlated, then the value of the best-of option is at a maximum value. The reason the value of a best-of option is maximized when the components are 100% anti-correlated is that if the value of a first asset has decreased at expiration, then the value of a second asset that is anti-correlated has correspondingly increased. Similarly, if the value of second asset has decreased, then the value first asset that is anti-correlated has increased. Accordingly, the value of the best-of option is at its maximum when the option components are 100% anti-correlated and the holder of a best-of option can assume that at option expiration one of the option components will have value.

In contrast, if the components of the best-of option are 100% correlated, then the first asset and the second asset either either increase or decrease. Thus, the best-of option holder has no benefit in selecting the best component represented in the option and therefore the value of the best-of option is zero. Additionally, if the best-of option components are not correlated to each other (0% correlation), then the value of the best-of option is dependent on whether any of the option components increases by the expiration date. Comparing FIGS. 3a and 3b, it can be seen that the value of a best-of option as a function of correlation can be a mirror image of the value of the basket option as a function of correlation such that a best-of option can be utilized to approximately hedge the correlation risk associated with a basket option.

In one exemplary embodiment, a best-of option that is formed to hedge the correlation risk of a basket option includes all of the components included in the basket option that is to be hedged. So, for example, if the basket option includes five currencies, the best-of option will also include those currencies.

Alternatively, the best-of option may only include a portion of the currencies included in the basket option. However, in this alternative embodiment, only the correlation risk associated with the components included in the best-of option is hedged.

Referring now again to FIG. 3b, in the example illustrated, the price of a best-of option on a set of ATMF options (i.e., the strike of each individual option equals the expected value of its underlying asset on its expiration) as a function of the correlation between the two assets in the basket.

The first asset has a forward price to the best-of option expiration of $100 and a volatility of 40%. The second asset has a forward price of $50 and a volatility of 60%. The correlation in the plot corresponds to the correlation between day-to-day returns in the two prices. The best-of option is an option on one unit of the first asset's option and two units of the second asset's option.

A comparison of FIG. 3a and FIG. 3b indicates that a change in value of the basket option as a function of correlation of the basket option components (FIG. 3b) is approximately the inverse of the change in value of the best-of option as a function of correlation of the best-of components (FIG. 3a). Therefore, a change in value as a function of correlation of the combination of the basket option and corresponding best-of option will be approximately zero. If a client owns both a basket option and a corresponding best-of option, the client's total risk as a result of the correlation between the basket option components are much reduced. Some minimal risk will typically remain, such as in the example illustrated wherein the basket prices range from $16.00 to $38.00 and the hedge only from $71.00 to $79.00. The correlating risk is reduced by approximately a factor of (79-71)/(38-16) or 0.36.

Figure 3C:
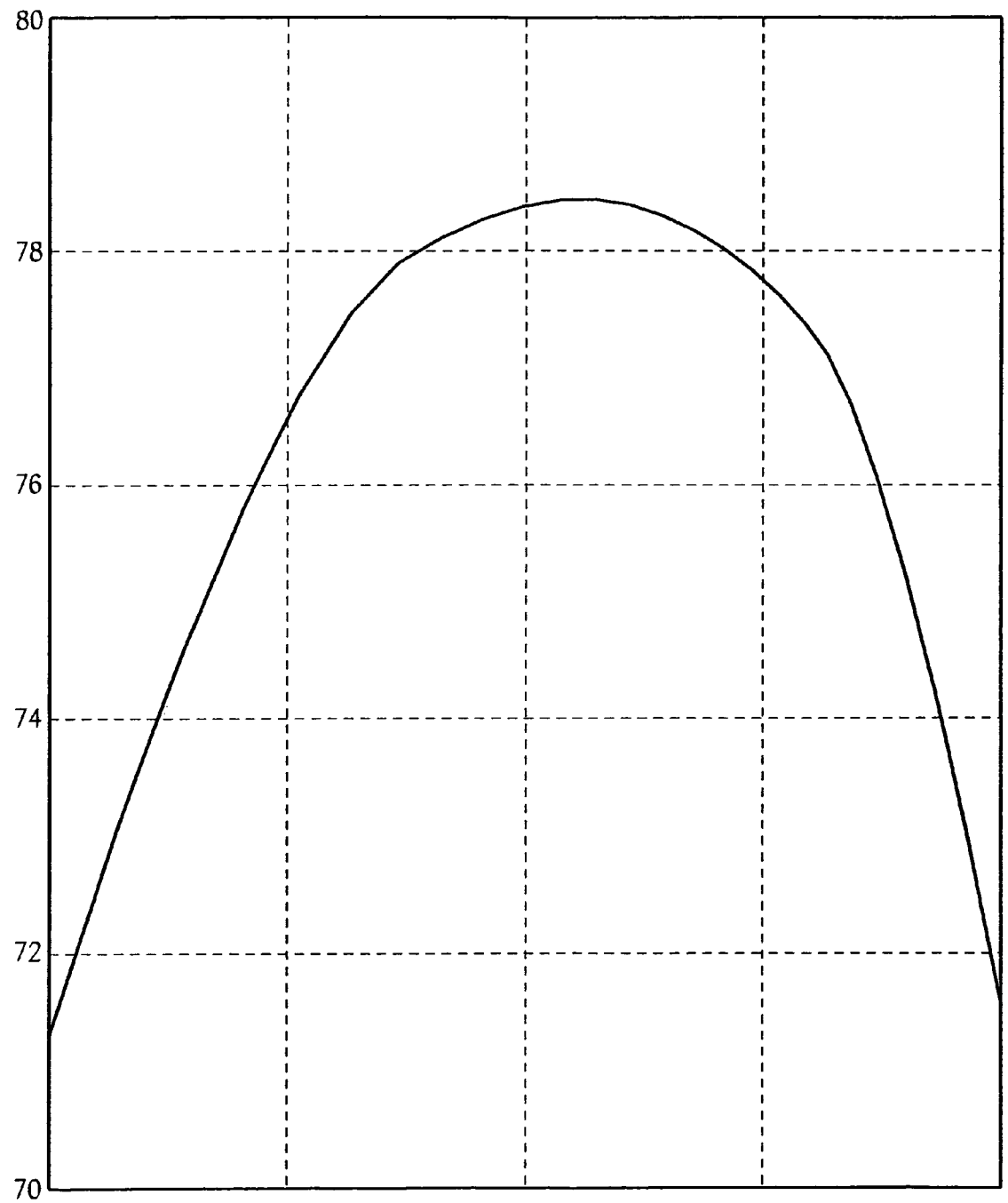
FIG. 3c is a plot of Price of Basket plus 1.4 at-the-money-forward Best-Of versus correlation.

Referring now to FIG. 3c, a plot illustrates the value of a portfolio of a basket option plus 1.4 units of a best-of option, as a function of the correlation between the two assets in the basket. The quantity of the best-of option to use was determined by making as optimal a global correlation hedge as possible for the basket option. It is a reasonably effective global hedge: the value of the basket option varies by $22 across different correlations; the value of the hedged portfolio only varies by $7.

Figure 3D:
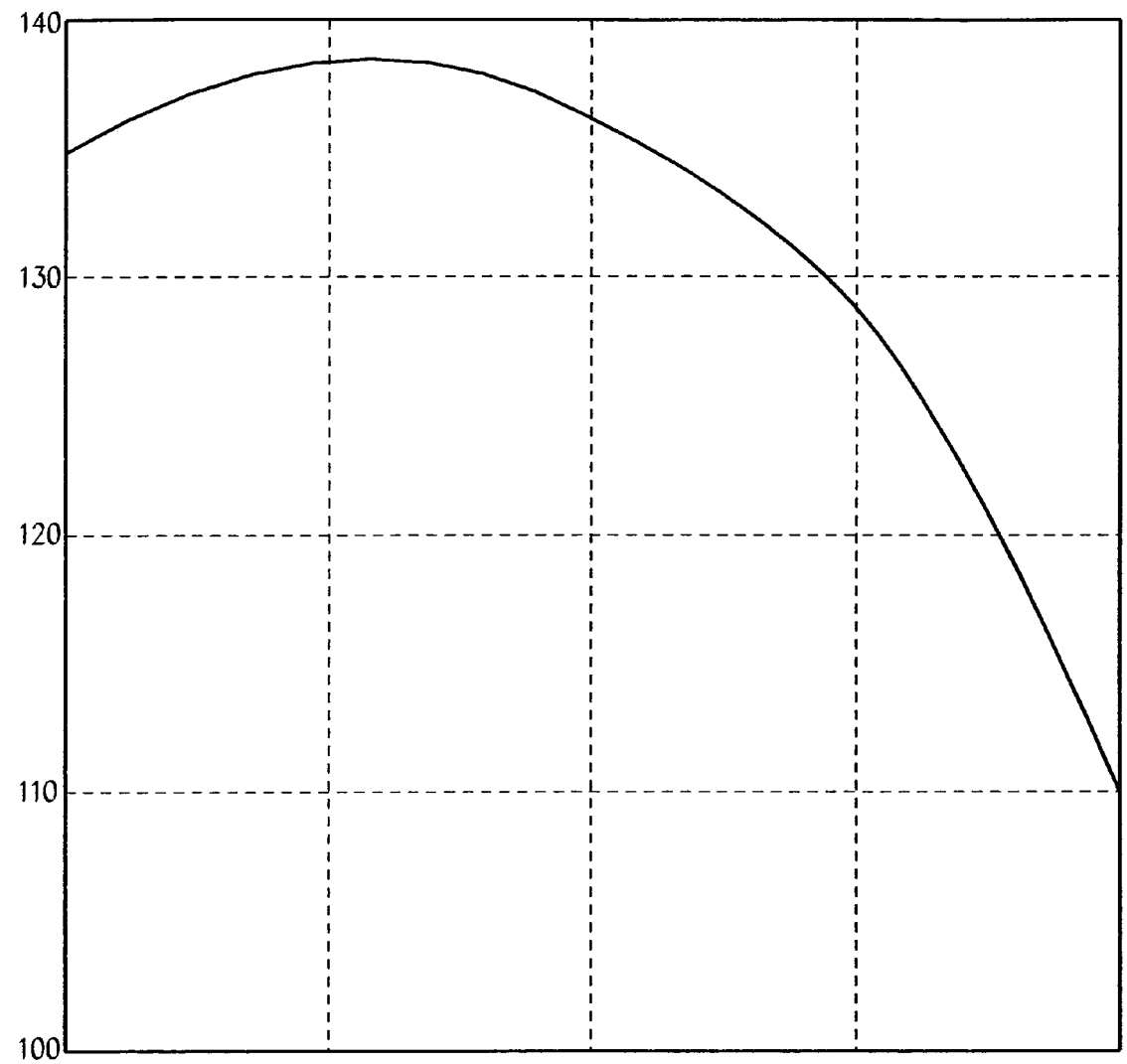
FIG. 3d is a plot of Price of Basket plus 3 at-the-money-forward Best-Of versus correlation.

The plot of FIG. 3d shows the value of a portfolio of the basket option plus 3 units of the best-of option as a function of the correlation between the two assets in the basket. The quantity of the best-of option to use was determined by making an optimal local correlation hedge near correlation =-50%. Near -50% correlation, the value of the hedged portfolio is quite insensitive to moves in correlation, though if the correlation moves too far the hedge does not do well.

This hedge might be used in a market where the correlations between the two assets has historically been quite steady near -50%. While not a good global hedge, it is an excellent local hedge, which is more important in a stable market.

An optimal hedge can depend the circumstances of a deal, such as the markets underlying the derivatives. For example, if the correlations between assets in a basket are relatively stable, a correlation hedge only needs to be effective near the current correlations. If the correlations are expected to be unstable, the correlation hedge needs to be a good hedge across a wide range of correlation values, perhaps sacrificing the effectiveness of the hedge at any particular correlation value. FIGS. 3c and 3d showing plotted prices of the combined portfolios illustrate this effect.

FIG. 3c shows a good global correlation hedge for the basket option using 1.4 units of the best-of option, because it minimizes the range of portfolio value as a function of correlation. This can be determined using standard numerical minimization techniques such as Brent minimization. The global hedge would be used in markets where the true value of the correlation is either difficult to measure, poorly understood, or subject to much variation over time.

FIG. 3d shows a good local correlation hedge using 3 units of the best-of option. It is very effective as a hedge near a correlation of -50%, but is not as effective as the global hedge for positive correlations. This hedge might be used in a market where the correlation between the asset prices has been very steady historically near -50%. The quantity of the best-of can be determined by forcing the slope of the price versus correlation function to be zero at a desired correlation. This can be obtained through standard numerical rootfinding techniques such as Brent rootfinding.

Furthermore, because the financial institution sold the client both the basket option and the best-of option, the financial institution's correlation risk associated with its short position in the basket option is hedged with its short position in the corresponding best-of option. Alternatively, instead of selling the best-of option to the client that purchased the basket option, the financial institution may sell the best-of option to a third-party to hedge its correlation risk. In this case, however, the client's correlation risk associated with the basket option remains unhedged.

It can be noted that in order to hedge the correlation risk associated with a basket option, a corresponding "best-of" option is combined with the basket option. So if a particular portfolio is long a basket option, then the correlation risk associated with that basket option is hedged by being long the corresponding best-of portfolio. Similarly, if a portfolio is short a basket option, then the correlation risk associated with that basket option is hedged by being short the corresponding best-of portfolio. For hedging the correlation risk, however, it does not matter whether the best-of option used to hedge is a call or put best-of option because call and put best-of options have the same sensitivity with respect to correlation.

Figure 4:
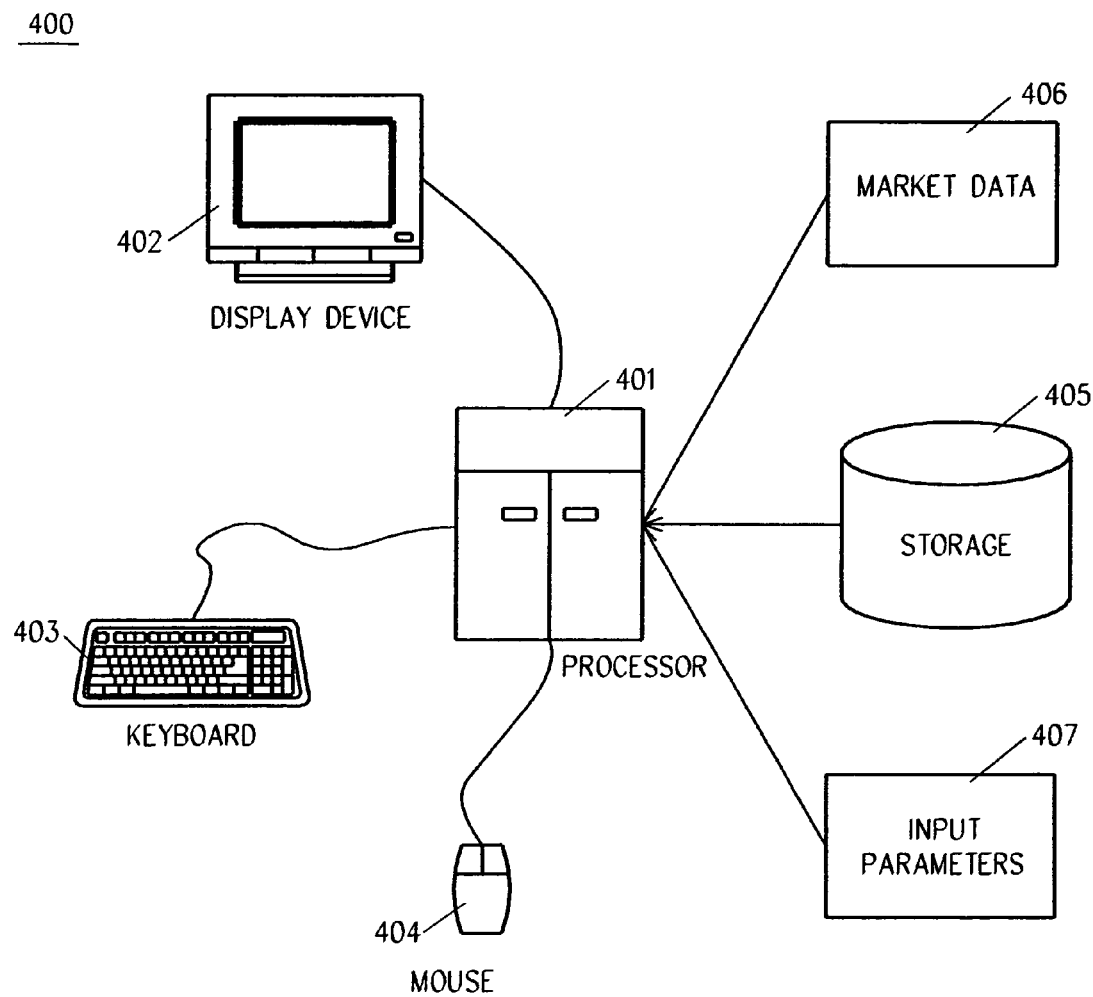
FIG. 4 is a computerized system for implementing the present invention.

Referring now to FIG. 4, another aspect of the Basket Option Hedging invention includes a computerized Basket Option Hedging system 400 for performing steps associated with the method discussed above. The computerized system can include a processor 401 capable of performing instructions contained in executable software and/or being responsive to user input. User input can be accepted through user input devices such as a keyboard 403, mouse 404 or other input device such as voice activation or pointing device. A display device 402 can be utilized to view information processed by the processor 401. A storage device 405 or other memory such as random access memory (RAM), read only memory (ROM) or a flash card can be utilized to store software and/or data. Stored software can be operative with the processor to perform desired actions. Input into the processor can also include market data 406 and input parameters 407 including option details, derivative descriptions, underlying assets, an option pricing formula or other desired information.

A user may also access processor 401 utilizing a communications network. Typically, software will be executed at a network access device and perform the same functionality as an operator directly accessing the processor. The client software may include a generic hypertext markup language (HTML) browser, such as Netscape Navigator or Microsoft Internet Explorer, (a "WEB browser"). The client software may also be a proprietary browser, and/or other host access software. In some cases, an executable program, such as a Java™ program, may be downloaded from the processor 401 to the client computer and executed at the client network access device or computer as part of the Basket Option Hedging system software. Other implementations include proprietary software installed from a computer readable medium, such as a CD ROM. The invention may therefore be implemented in digital electronic circuitry, computer hardware, firmware, software, or in combinations of the above. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

Figure 5:
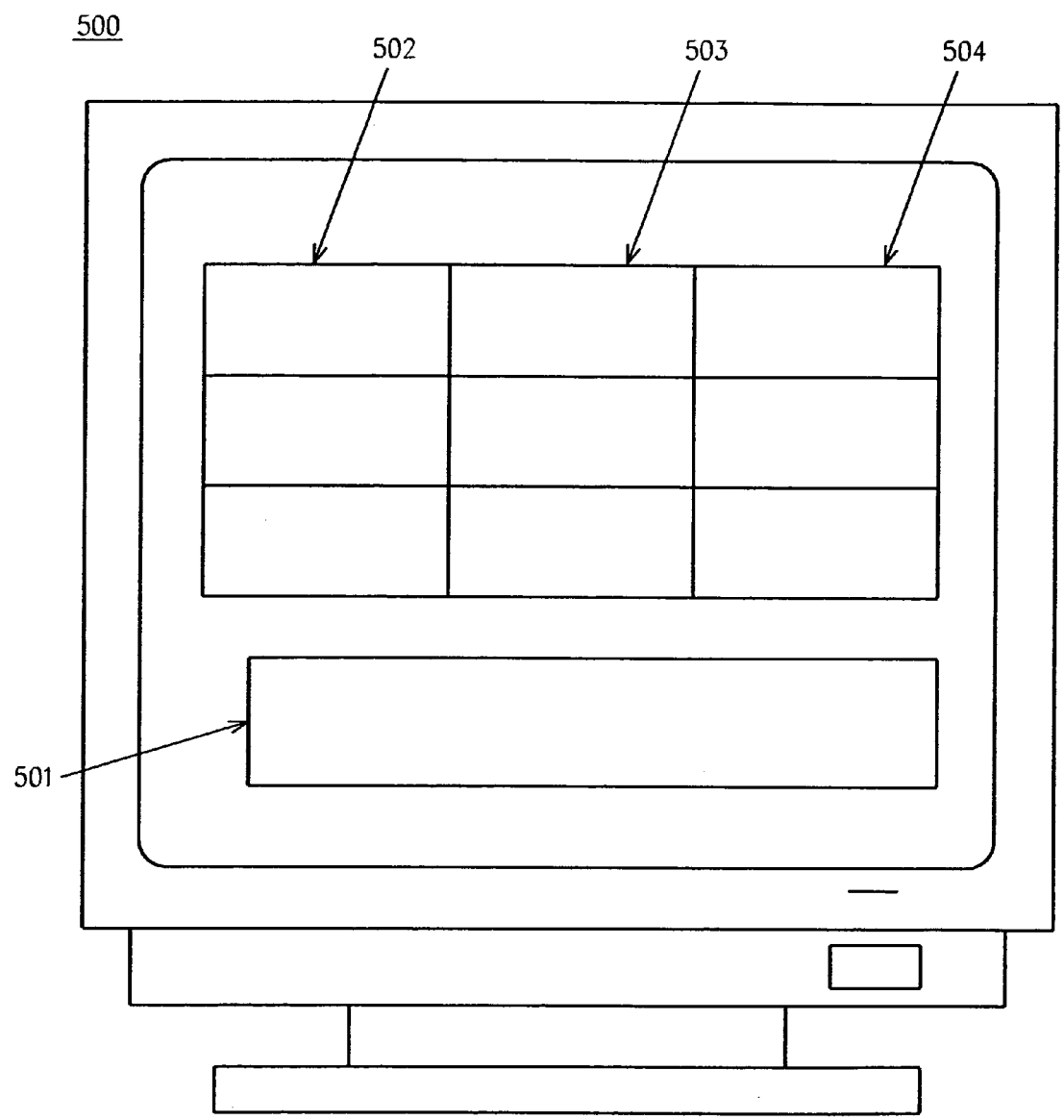
FIG. 5 is an exemplary interface for implementing the present invention.

Referring now to FIG. 5, a unique Basket Option Hedging interface 500 can be utilized to allow a user to interact with the Basket Option Hedging system 400. The Basket Option Hedging interface 500 can include a graphical user interface (GUI) displayed on the display device 402. Portions of the interface 500 can include an area for displaying graphical representations of plots associated with a basket/best-of hedge 501. Other areas can include an area for displaying individual options included a basket 502, an area displaying an expected value of a basket at expiration 503, an area displaying effective basket volatility 503, an area displaying the quantities of individual options set to match the quantities of underlying assets in the basket option 504, and areas for displaying other functionalities related to the method disclosed herein.

Although the description above related to hedging the correlation risk of basket options on currencies, it will be obvious to one of ordinary skill to apply the present invention to hedge the correlation risk of basket option on any other type of instrument including, by way of non-limiting example, equities, commodities, and debt instruments.

It will thus be seen that the objects set forth above, among those made apparent from the preceding description, are efficiently attained and, since certain changes may be made in carrying out the above process, in a described product, and in the construction set forth without departing from the spirit and scope of the invention, it is intended that all matter contained in the above description shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

The invention claimed is:

1. A computer-implemented method for hedging a correlation risk associated with a basket option, said basket option including a plurality of securities, the method comprising:
 receiving in a computer storage element information relating to a plurality of securities;
 defining, in a computer storage element with an input device operatively connected to a computer processor, a basket option on the received plurality of securities, wherein said basket option is exposed to a correlation risk defined by factors comprising the volatility of individual components of the basket option and the relative weight of the respective components;
 executing via the computer processor a transaction comprising conveyance of the basket option to provide a hedge against risk in a portfolio comprising the plurality of securities;
 forming in the computer storage element a matching best-of option for said basket option based on a correlation factor of the basket option components, wherein said best-of option is an option on a security with the best return of a plurality of securities during a predefined period of time;
 executing via the computer processor a transaction comprising conveyance of said matching best-of option to provide a hedge against the correlation risk associated with the basket option.

2. The method of claim 1, wherein the defining a basket option on the received plurality of securities includes:
 setting a strike price of the basket option based on weighted value of the individual components of the basket; and
 wherein the forming a matching best-of option for the basket option includes:
  forming a best-of option for all of the received plurality of securities in the basket option.

3. The method of claim 1, wherein said hedging transaction comprising conveyance of the basket option includes selling said basket option and said hedging transaction comprising conveyance of the best-of option includes selling said best-of option.

4. The method of claim 1, wherein said securities include foreign exchange securities.

5. The method of claim 1, wherein said securities include equities.

6. The method of claim 1, wherein said plurality of securities comprise commodities.

7. The method of claim 1, wherein said plurality of securities comprise debt instruments.

8. A computer-implemented method for managing investment instruments comprising:
 hedging a correlation risk associated with purchasing a basket option and defined by factors comprising volatility of individual components of the basket and relative weight of the components, said basket option including a plurality of securities, the method further comprising:
 receiving in a computer storage an indication of the plurality of securities comprising the basket option;
 presenting a best-of option based on a correlation factor of the basket option components to act as a hedge against the correlation risk associated with the basket option, the best-of option comprising at least two of said plurality of securities comprising the basket option, wherein said best-of option is an option on a security with the best return of the at least two of said plurality of securities during a predefined period of time;

receiving into the computer processor an indication to purchase the best-of option comprising the at least two of said plurality of securities; and executing a transaction conveying the best-of option comprising the at least two of said plurality of securities.

9. The method of claim 8, wherein said best-of option includes all of said plurality of securities.

10. The method of claim 8, wherein said basket option is a basket put option and the executing a transaction conveying the best of option includes:

purchasing said basket put option.

11. The method of claim 8, wherein said basket option is a basket call option and said executing a transaction conveying the best of option includes:

purchasing said basket call option.

12. The method of claim 8, wherein said executing a transaction conveying the best of option includes:

purchasing said best-of option.

13. The method of claim 8, wherein said executing a transaction conveying the best of option includes:

selling said best-of option.

14. The method of claim 8, wherein said plurality of securities includes foreign exchange securities.

15. The method of claim 8, wherein said plurality of securities includes equities.

16. The method of claim 8, wherein said plurality of securities includes commodities.

17. The method of claim 8, wherein said plurality of securities includes debt instruments.

18. The method of claim 8, wherein the best-of option is formed by steps comprising:

calculating via the computer processor an expected value of the basket upon expiration;

calculating via the computer processor an effective basket volatility;

calculating via the computer processor an effective delta of the basket option; and calculating via the computer processor strikes for each option included in the basket.

19. A computerized system for hedging a correlation risk associated with a basket option, said basket option including a plurality of securities, the system comprising:

a computer server comprising a processor and a memory; and executable software stored on the memory and executable on demand, the software operative with the server to cause the system to:

receive in a computer storage element information relating to a plurality of securities;

define in a computer storage element with an input device operatively connected to a computer processor a basket option on the received plurality of securities, wherein said basket option is exposed to a correlation risk defined by factors comprising the volatility of individual components of the basket and the relative weight of the components;

execute a transaction comprising conveyance of the basket option to provide a hedge against risk in a portfolio comprising the plurality of securities;

form in the computer storage a matching best-of option for said basket option on the plurality of securities based on a correlation factor of the basket option components, wherein said best-of option is an option on a security with the best return of the plurality of securities during a predefined period of time;

execute a transaction comprising conveyance of said matching best-of option to provide a hedge against the correlation risk associated with the basket option.

20. The computerized system of claim 19 wherein the defining in a computer storage element a basket option on the plurality of securities includes:

setting a strike price of the basket option based on weighted value of the individual components of the basket; and wherein the forming a best-of option for said basket option includes:

forming a best-of option for all of said individual components.

21. A processor-implemented method for hedging a correlation risk, comprising:

receiving in a computer storage a selection of securities exposed to financial risk;

defining a basket option on the received securities, wherein said basket option is exposed to a correlation risk, and wherein said basket option provides a hedge against risk in a portfolio comprising the received securities;

defining a correlation risk with factors comprising the volatility of individual components of the basket option and the relative weight of the respective components;

receiving an indication to purchase said basket option;

determining an effective basket volatility;

forming a matching best-of option for said basket option on the securities based on a correlation factor of the basket option components and the determined basket volatility, wherein said best-of option is an option on a security with the best return of the securities during a predefined period of time;

executing via the processor a transaction comprising conveyance of said matching best-of option to provide a hedge against the correlation risk associated with the basket option;

executing a transaction comprising conveyance of the matching basket of options.

* * * * *